Figure 3:
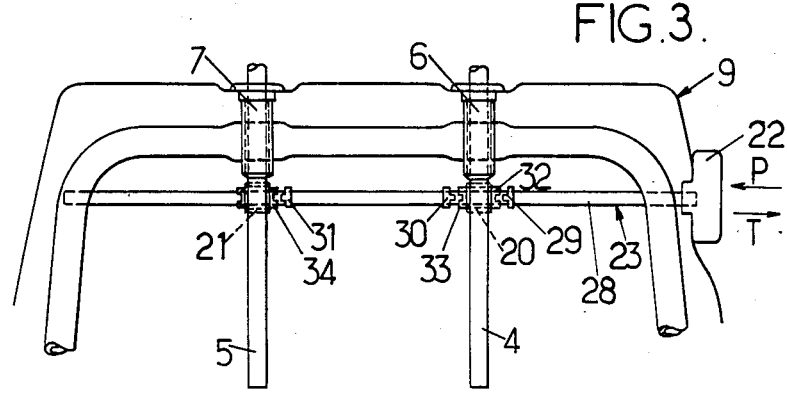

United States Patent [19]

Boisset

[11] Patent Number: 4,668,014
[45] Date of Patent: May 26, 1987

[54] ADJUSTABLE HEADRESTS AND TO SEATS EQUIPPED WITH SUCH HEADRESTS

[75] Inventor: Bernard Boisset, Etampes, France

[73] Assignee: Societe Industrielle Bertrand Faure, Etampes, France

[21] Appl. No.: 865,704

[22] Filed: May 21, 1986

[30] Foreign Application Priority Data

Jun. 12, 1985 [FR] France ............... 85 08887

[51] Int. Cl.⁴ ............................................. A47C 1/10
[52] U.S. Cl. .................................... 297/408; 297/410
[58] Field of Search ................. 297/408, 410, 391

[56] References Cited

U.S. PATENT DOCUMENTS 4,350,389 9/1982 Parsson et al. .................. 297/410

FOREIGN PATENT DOCUMENTS 3141515 4/1983 Fed. Rep. of Germany ...... 297/410
2057255 3/1981 United Kingdom ............... 297/410

Primary Examiner—James T. McCall
Attorney, Agent, or Firm—Townsend and Townsend

[57] ABSTRACT

The invention relates to a seat with a headrest adjustable in height and in slope for which the framework (2) of the headrest (1) is mounted on that (8) of the seat back (9) of the seat by two parallel pins (4, 5) fixed to this framework of the headrest and adapted for sliding vertically in complementary housings (6, 7) fixed to the framework of the seat back. The framework of the headrest is mounted for pivoting about respectively two transverse horizontal axes (bars 11 and 13) offset longitudinally with respect to each other and connected respectively to the two pins (4, 5) and means operable by the person sitting in the seat are provided for controlling at will either the simultaneous and identical vertical sliding of the two pins or the vertical sliding of one only of these two pins.

9 Claims, 5 Drawing Figures

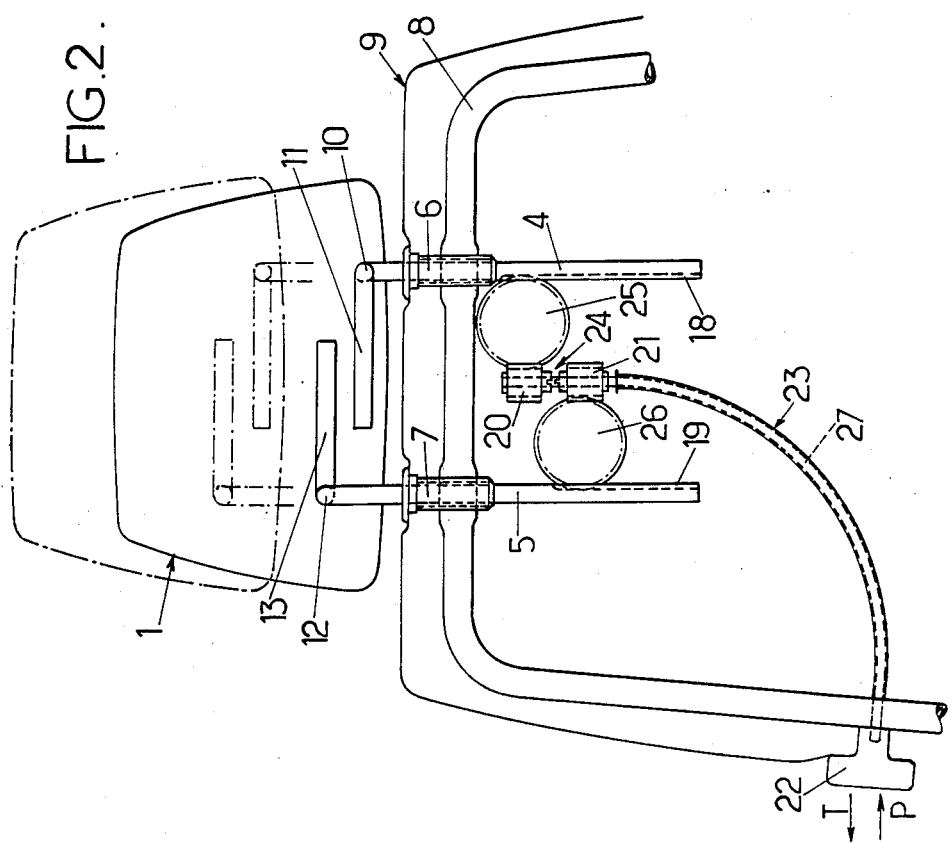
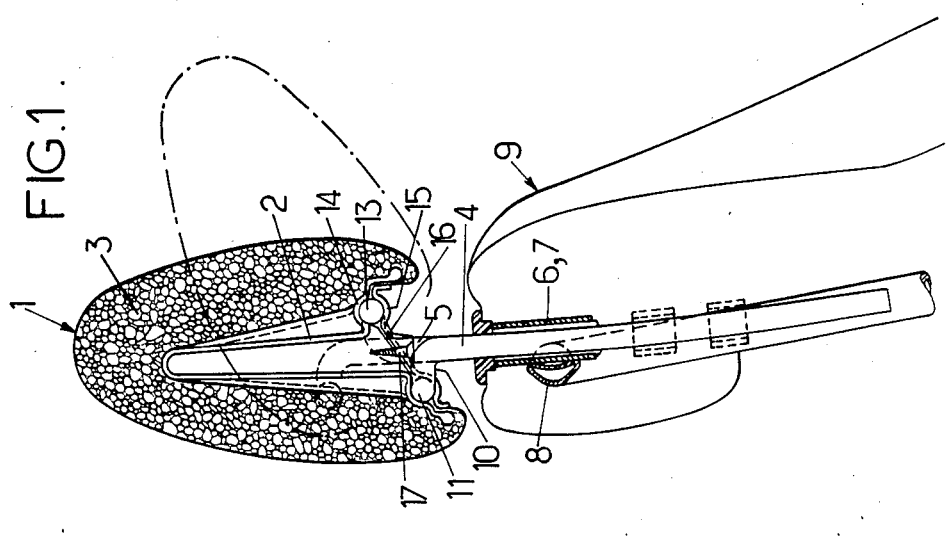

ADJUSTABLE HEADRESTS AND TO SEATS EQUIPPED WITH SUCH HEADRESTS

The invention relates to headrests which are adjustable in height and in slope which equip seats and more particularly vehicle seats.

It relates also to the seats equipped with such headrests.

It relates more particularly, among headrests of the above kind, to those which are mounted on the framework of the seat back of the seat by means of two parallel pins adapted for sliding vertically in complementary housings fixed to this framework.

In known embodiments of said headrests, the framework of the headrest is itself mounted for pivoting about a transverse horizontal axis, i.e. extending across the width of the seat, which axis itself intersects the axis of these two pins at their upper ends.

Control of the pivoting of these headrests is difficult and locking of these pivoting movements is difficult to achieve efficiently. The aim of the invention is especially to overcome these drawbacks.

For this, headrests of the kind in question in accordance with the invention are essentially characterized in that their framework is mounted for pivoting respectively about two transverse horizontal shafts offset longitudinally with respect to each other and connected respectively to the two pins and in that means operable by the person sitting in the seat are provided for controlling at will either the simultaneous and identical vertical sliding of the two pins, or the vertical sliding of only one of these two pins.

In preferred embodiments, recourse is further had to one and/or other of the following arrangements:

each pivoting mounting of the base of the framework of the headrest is provided about an extension of a pin doubly bent horizontally, a first time longitudinally forwards for one pin and rearwards for the other and a second time transversely in the direction of the other pin, each pivoting mounting is provided about a bar welded against the fron (or rear) face of the upper end of a pin, which end is itself offset forwardly (or rearwardly) with respect to the axis of the sliding section of this pin, each pivoting mounting of the base of the framework of the headrest is provided by imprisoning a cylindrical bar with horizontal axis integrally associated with a pin between two curved half shells clamped one against the other and forming part of said framework of the headrest, the means for controlling the movements of the pins comprise two racks provided respectively on the feet, of these two pins, situated in the seat back, two pinions meshing, directly or not, with respectively these two racks and being immobilized axially, a rotary control member operable by the person sitting in the seat, a torque transmitting element engaged angularly with the control member, and coupling members adapted so as to engage either one only of the two pinions or these two pinions at the same time angularly with said transmitting element, the coupling members comprise dogs engaged angularly respectively with the pinions and with the transmitting member and adapted for being coupled together and uncoupled by simple relative axial movements thereof, which are controlled by axial movements of the control member, the torque transmitting member is a horizontal bar, the torque transmitting member is a flexible cable and the rotary control member is a handle mounted in a position on the seat easily accessible to the hand of a person sitting in the seat.

The invention comprises, apart from these main arrangements, certain other arrangements which are preferably used at the same time and which will be more explicitly discussed hereafter.

In what follows, preferred embodiments of the invention will be described with reference to the accompanying drawings in a way which is of course in no wise limitative.

Figure 5:
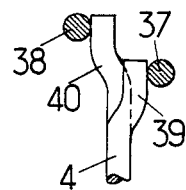
Figure 4:
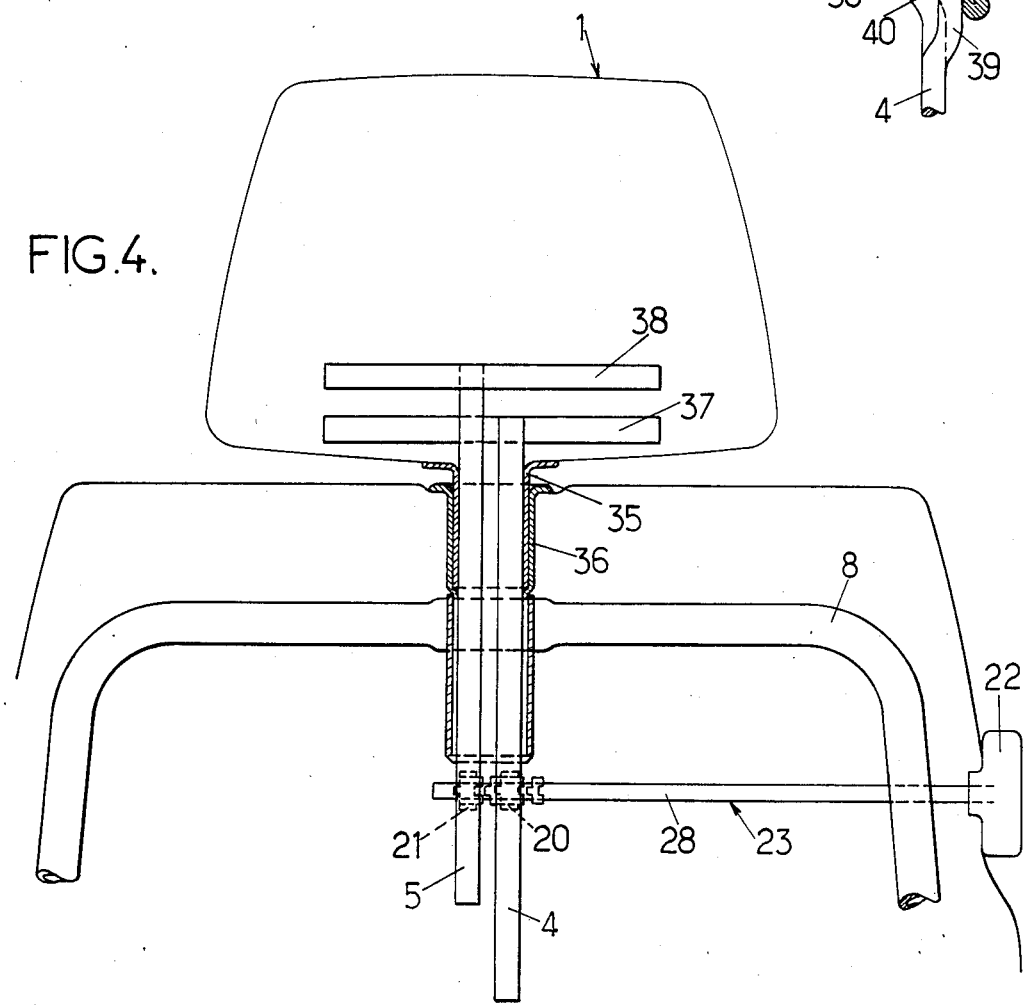

FIGS. 1 and 2, of these drawings, show respectively in vertical longitudinal section and in a rear view, with parts cut away, a head rest formed in accordance with the invention and the upper part of the seat back to which is is fitted, FIGS. 3 and 4 show respectively two variants of such an assembly in partial rear views, and FIG. 5 shows in a side view a detail of the variant of FIG. 4.

In the embodiment of FIGS. 1 and 2, the headrest 1 comprises in a way known per se a rigid internal framework 2 and an upholstery cushion 3 and it is supported by two parallel vertical pins 4 and 5, themselves mounted for sliding in two sockets 6 and 7 fixed to the tubular framework 8 of the seat back 9 of the corresponding seat.

The upper end of pin 4 is bent successively along a section 10 oriented rearwardly of the seat, then transversely, that is to say along the width of the seat, in the direction of the other pin 5, so as to form an endmost rectilinear bar or section 11.

Similarly, the upper end of pin 5 is bent successively along a section 12 oriented forwardly of the seat, then transversely in the direction of the other pin 4, so as to form an endmost rectilinear bar or section 13.

The two end rectilinear bars 11 and 13 both cross the median longitudinal plane of the seat and are offset with respect to each other longitudinally, that is to say in the longitudinal direction of the seat, by a distance which is generally of the order of 5 to 10 cm.

Framework 2 of the headrest is mounted for pivoting at the same time on these two bars 11 and 13.

For this, it has advantageously two semicylindrical shells 14 adapted for jointingly covering the two bars considered and coacting respectively with two other semicylindrical half shells 15 forming part of a cover 16 itself assembled by screws 17 on said framework 2.

With such mounting, the headrest may be adjusted in height and in slope respectively by simultaneous vertical movements of the two pins 4 and 5 and by differentiated vertical movements of these two pins.

In fact, in this latter case, the vertical movement of one of the two bars 11 and 13 with respect to the other results in a change of slope of the headrest.

To control these different simultaneous or differentiated movements of the two pins 4 and 5, the following are provided:

two racks 18 and 19 on respectively the two feet of said pins, two pinions 20 and 21 meshing directly or not with these racks and immobilized axially by means not shown, a rotary control handle 22 operable by the person sitting in the seat, a torque transmitting member 23 engaged angularly with handle 22, and at least one coupling member 24 for angularly engaging the two pinions 20 and 21 at the same time, or one only of these two pinions with the transmitting member 23.

In the embodiment illustrated in FIG. 2, the two pinions 20 and 21 mesh with the two racks through appropriate gears 25 and 26 whose horizontal parallel axes are oriented in the longitudinal direction of the seat, which means that the two pinions in question can be made coaxial about a vertical axis extending in the median longitudinal plane of the seat back, the torque transmitting member 23 is a flexible cable 27 extending over a quarter of a circle between handle 22, situated on the side of the seat back at the base thereof, and pinions 20 and 21, the first pinion 20 is engaged angularly permanently with cable 27, and the second pinion 21 is mounted freely rotating on this cable for the axial position thereof corresponding to the "pushed in" or pressed in state of handle 22 (shown by arrow P), in which position two complementary dogs forming part of the coupling member 24 and integral respectively with said pinion 21 and with said cable are separated from each other, the "pulled out" or extended position (arrow T) of the handle 22 resulting on the contrary in the mutual engagement of the two dogs in question and so the angular engagement of pinion 21 with cable 23.

With such a mechanism, it is only necessary to turn the handle 22 in its drawnout or extended position for adjusting the headrest 1 in height and to turn this handle in its pushed in or pressed in position for adjusting the slope of the headrest; in the first case, the movements of the two pins are simultaneous and identical whereas, in the second, only pin 4 is moved as well as bar 11, which is driven with a rotational movement about the axis of bar 13.

The fact of forming the torque transmitting member 23 by a flexible cable, the construction of which has just been described, means that handle 22 may be placed in any desirable position on the seat.

This construction also lends itself to motorization, the end of the flexible cable 23 the furtherest away from pinions 20 and 21 being driven by an electric motor situated in the sitting portion of the seat and controllable by means of an appropriate control button readily accessible to a person sitting in the seat.

The variant of FIG. 3 differs from the preceding one in that the torque transmitting member 23 is a fixed bar 28 which is mounted in the top part of the seat back and extends along the width of the seat.

Pinions 20 and 21, which are still immobilized axially, here mesh directly with racks 18 and 19 carried by pins 4 and 5 and they are mounted freely rotating on the bar 28.

This bar is integral with three dogs 29, 30 and 31 adapted for coacting respectively with three complementary dogs 32, 33 and 34, the first two of which are integral with pinion 20 and the third with pinion 21.

An axial thrust exerted on handle 22 in the direction of arrow P results in engaging dogs 29 and 31 with their opposite members 32 and 34 and so in placing the two pinions 20 and 21 in engagement with said handle, which allows height adjustments of the headrest by simple rotation thereof.

On the contrary, an axial pull exerted on handle 2 in the direction of arrow T results in the mutual engagement of dogs 30 and 33 and disengagement of the others, so that only pinion 21 is then engaged with handle 22, which makes it possible to adjust the slope of the headrest by rotating this handle.

The variant shown in FIGS. 4 and 5 differs from that of FIG. 3 by the following points:

the two pins 4 and 5, instead of being mounted in two separate sleeves 6 and 7 of the seat back, are contained in the same sheath 35 of elongate section itself mounted for vertical sliding in a complementary sleeve 36 integral with the framework 8 of seat back 9, the two dogs 30 and 31 are formed by a single piece since the two pins 4 and 5 are here very close together, the horizontal axes about which the framework of the headrest is pivotally mounted are materialized by two bars 37 and 38 the first of which is welded against the front face of the upper end, of pin 4, offset forwardly by an appropriate bend 39 (FIG. 5) and the second of which is welded against the rear face of the upper end, of pin 5, offset rearwardly by a bend 40.

Following which and whatever the embodiment adopted, an adjustable headrest is finally obtained whose construction and operation follow sufficiently from the foregoing.

This headrest has numerous advantages with respect to those known up to present and, in particular, robustness and simplicity of operation since:

the two height and slope adjustments may be very easily provided from one and the same control member, and the slope variations of the headrest require relatively small forces because of the size of the lever arm used, which arm corresponds to the distance between the two horizontal pivoting axes of the headrest.

Of course, it is advisable in each case to ensure the irreversibility of the controls, that is to say to make it impossible to offset the height and/or slope adjustments of the headrest by exerting simple thrusts thereon.

This irreversibility is provided in the embodiment shown in FIGS. 1 and 2 by giving appropriate slants to the meshing teeth of the different pinions 20, 21 and 25 26 and racks 18, 19.

For the other constructions, angular locking members are advantageously provided at the level of the control handle 22, for its axial position corresponding to its angular engagement with the two pinions 20 and 21.

As is evident, and as it follows moreover already from what has gone before, the invention is in no wise limited to those of its modes of application and embodiments which have been more especially considered; it embraces, on the contrary, all variants thereof and in particularly:

those where one of the two horizontal pivoting axes of the headrest is materialized by an extension of one of the two pins bent simply horizontally, which extension is situated in the same vertical transverse plane as this pin, and those where one of the two horizontal pivoting axes of the headrest is materialized by an articulation of the ball joint type or similar.

I claim:

1. Seat with headrest adjustable in height and in slope for which the framework (2) of the headrest (1) is mounted on that (8) of the seat back (9) of the seat by means of two parallel pins (4, 5) connected to said framework of the headrest and adapted for sliding vertically in complementary housings (6, 7) fixed to the framework of the seat back, wherein said seat back of the headrest is mounted for pivoting about respectively two transverse horizontal axes offset longitudinally with respect to each other and connected respectively to the two pins (4, 5) and means operable by the person sitting in the seat are provided for controlling at will either the simultaneous and identical vertical sliding of the two pins, or the vertical sliding of only one of said two pins.

2. Seat with headrest according to claim 1, wherein each of the two pivoting mountings of the framework (2) of the headrest is provided about the retilinear end (11, 13) of an extension, of a pin (4, 5), doubly bent horizontally, once longitudinally forwardly, (at 12) for one pin and rearwardly (at 10) for the other, and a second time transversely in the direction of the other pin.

3. Seat with headrest according to claim 1, wherein each of the two pivoting mountings of the framework (2) of the headrest is provided about a bar (37, 38) welded against the front (or rear) face of the upper end of a pin (4, 5), which end is itself offset forwardly (or rearwardly) with respect to the axis of the sliding section of this pin.

4. Seat with headrest according to claim 1, wherein each of the two pivoting mountings of the framework (2) of the headrest is provided by imprisoning a cylindrical bar with horizontal axis (11, 37; 13, 38) integral with a pin (4, 5) between two half shells (14, 15) clamped against each other and forming a part of said framework of the headrest.

5. Seat with headrest according to claim 1, wherein the means controlling the movements of the pins (4, 5) comprise two racks (18, 19) provided respectively on the feet, of these two pins, situated in the seat back (9), two pinions (20, 21) meshing directly or not, with respectively these two racks and being immobilized axially, a rotary control member (22) operable by the person sitting in the seat, a torque transmitting member (23) engaging angularly with the control member, and coupling members adapted so as to engage either one only of the two pinions, or these two pinions at the same time angularly with said transmitting element.

6. Seat with headrest according to claim 5, wherein the coupling members comprise dogs (24; 29-34) engaged angularly respectively with the pinions (20, 21) and with the torque transmitting member (23) and adapted for being coupled together and uncoupled by simple relative axial movements thereof which are controlled by axial movements of the control member (22).

7. Seat with headrest according to claim 5, wherein the torque transmitting member is a horizontal bar (28).

8. Seat with headrest according to claim 5, wherein the torque transmitting member is a flexible cable (27) and in that the rotary control member is a handle (22) mounted in a position of the seat readily accessible to the hand of a person sitting in this seat.

9. Headrest for equipping a seat according to claim 1, wherein its framework is mounted for pivoting about two horizontal shafts offset longitudinally with respect to each other and connected respectively with the upper ends of two substantially vertical parallel pins (4, 5) disposed side by side along the width of the headrest.

* * * * *